Figure 1:
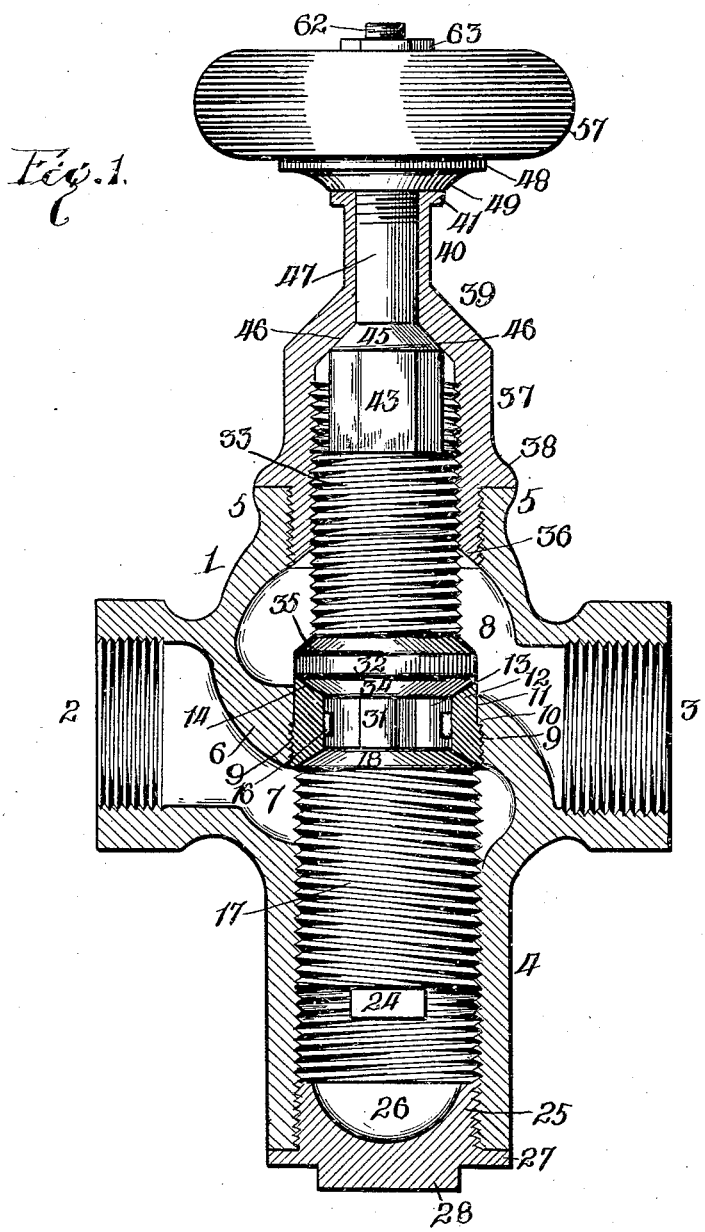

No. 875,496. PATENTED DEC. 31, 1907.
J. A. BISHOP.
HIGH PRESSURE VALVE.
APPLICATION FILED DEC. 18, 1906.

2 SHEETS—SHEET 1.

Witnesses:
Wm. P. Bond
Pierson N. Banning

Inventor:
James A. Bishop
by Banning & Banning
Attys.

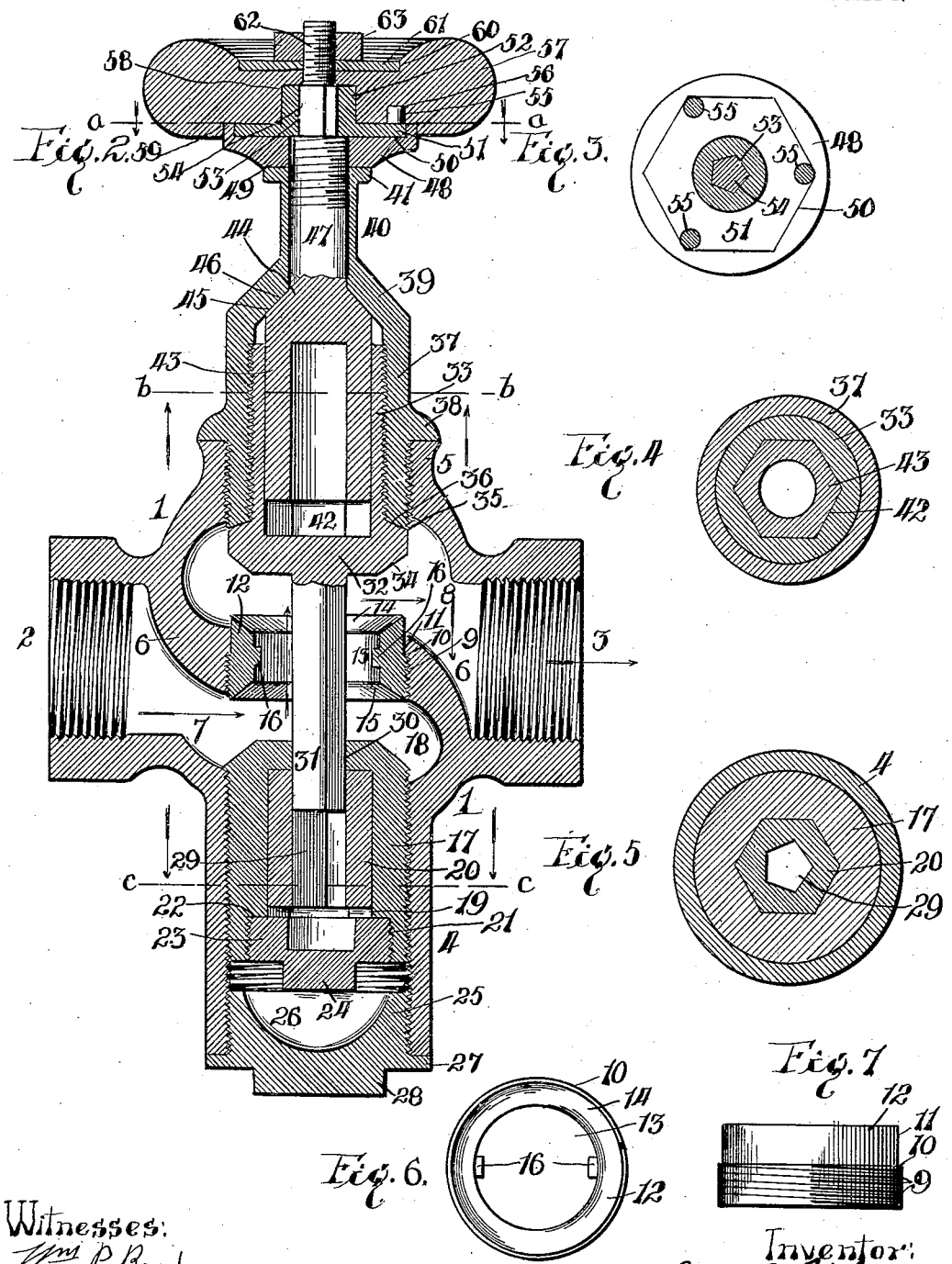

UNITED STATES PATENT OFFICE.

JAMES A. BISHOP, OF CHICAGO, ILLINOIS.

HIGH-PRESSURE VALVE.

No. 875,496.  Specification of Letters Patent.  Patented Dec. 31, 1907.

Application filed December 18, 1906. Serial No. 348,425.

*To all whom it may concern:*

Be it known that I, JAMES A. BISHOP, a citizen of the United States, residing at Chicago, in the county of Cook and State of Illinois, have invented certain new and useful Improvements in High-Pressure Valves, of which the following is a specification.

It is a necessity, in the use of high pressure valves, that the seating capacity of the valve plug or stem shall be accurate and close, particularly when the valve is used with steam, in order to prevent escape around the seat, as the escape or leakage of steam will cut and impair the seat faces, soon rendering the valve practically useless. A high pressure valve for obtaining the best results should be made entirely of metal throughout so as to avoid the use of packing for the seat.

The objects of the present invention are to construct a high pressure valve having a plurality of seats coöperating to prevent leakage and consequent cutting out of the valve; to construct a high pressure valve having four seating faces and two movable plugs coacting with the seating faces for closing and opening the valve; to furnish an operating stem having a cone section or seating face to coact with a corresponding face on the casing, and a movable valve plug having a seating face coacting with a seating face on the casing and furnishing a relief for the conical section or seating face of the valve stem when the valve is wide open; to connect the first valve plug with the second valve plug so that the advance and withdrawal of the first valve plug will advance and withdraw the second valve plug; to furnish an interlocking connection for the second valve plug with the first valve plug and have such connection lock and retain the adjustment for the valve seats with the two plugs when in adjusted position; to cause the two valve plugs to operate in unison but in opposite directions for closing and opening the passage through the valve casing; to enable the two valve plugs to travel in unison and in opposite directions by operating one plug through a right handed threaded connection and the other plug through a left handed threaded connection; to dispense with the use of packing for the valve seats, thereby obtaining an absolutely packless valve; to enable the valve plugs to self-pack through the operating threads of the plugs and the pressure which exert a force in the same direction; to overcome leakage from expansion and contraction and the springing of the valve casing or straining of the threads of the valve plugs under high pressure; to furnish two valve seats serving as the means for producing a perfect and close packing, and two valve seats serving as the means for regulating the flow of liquid or fluid pressure through the valve with one set of valve seats held by the screw threads of the plug and opposed by the pressure, and the other set of valve seats held closed by the screw threads and the pressure, both of which serve to seat the valve firmly; to securely close the lower end of the second valve against the passage or escape of steam, liquid, fluid or gas when closed; to furnish a positive adjustment and lock for the valve stem; to enable the adjustment of the valve plugs in coöperative relation to be attained quickly and with precision; and to improve generally the construction and arrangement of the several parts or elements entering into the construction of the valve as a whole.

In the drawings illustrating the invention Figure 1 is a sectional elevation of the casing, with the valve plugs and operating stems in full elevation; Fig. 2 a sectional elevation of the casing and the valve plugs, with the operating stems in full elevation; Fig. 3 a cross section on line *a—a* of Fig. 2 looking in the direction of the arrow, with the hand wheel and casing omitted; Fig. 4 a cross section on line *b—b* of Fig. 2 looking in the direction of the arrow, with the hand wheel and locking plate omitted; Fig. 5 a cross section on line *c—c* of Fig. 2 looking in the direction of the arrow; Fig. 6 a plan view of the ring carrying the seating faces for opening and closing the valve; and Fig. 7 an elevation of the ring shown in Fig. 6.

The valve, in the construction shown, has a casing with a center or main body 1 having on one side a neck or coupling 2 with an interior screw thread and on the opposite side a neck or coupling 3 with an interior screw thread, said necks furnishing the attachment for an inlet pipe and an outlet pipe respectively, said pipes not being shown. The center or main body of the shell has an elongated neck or tubular portion 4 and a neck or coupling 5, both the elongated neck and the coupling neck having an interior screw thread, which thread for the neck or tube 4 is a left handed screw thread.

The center or main portion of the valve casing has a division wall or partition 6, separating the interior of the center or body into an inlet passage or chamber 7 from the inlet coupling 2, and an outlet passage or chamber 8 from the outlet coupling 3, so that when the valve is open steam or other pressure or liquid can flow through the valve. The wall or partition 6 has a center circular opening or passage 9 with a screw thread, and a shoulder or stop 10, and a plain surface 11 in its face or wall. A metal ring 12, having a center opening or passage 13, with an exterior screw thread, a shoulder and a plain surface corresponding to the screw thread 9, shoulder 10, and plain surface 11 of the dividing cross wall or partition 6, is entered into the opening or passage of the wall or partition and furnishes, through the opening or passage 13, communication between the inlet passage or chamber 7 and the outlet passage or chamber 8 of the valve shell or casing. The ring has a seating face 14 on one side and a seating face 15 on the opposite side. As shown, the inner face of the ring 12 has lugs 16 for the attachment of a spanner wrench or other instrument by means of which the ring can be entered through the neck or tube 4 into the wall or partition 6, for which purpose the exterior thread of the ring corresponds to the interior thread of the neck and the partition or wall. The ring 12 with its two seating faces 14 and 15, when entered into the partition or wall 6, has a close and accurate fit and leakage is prevented by reason of the screw threaded connection and the abutting faces of the stop or shoulder 10 on the wall or partition and the corresponding and coinciding stop or shoulder on the ring.

The neck or tube 4 receives thereinto a plug 17, having a left hand exterior screw thread corresponding to the left hand interior screw thread of the neck or tube, so that the turning of the plug will advance and withdraw its acting end in relation to the seating face 15 of the valve ring 12 for closing and opening the passage 13 in the valve ring. The valve plug 17 has an acting face 18 to coöperate with the seating face of the valve ring and close the communication through the valve shell or casing, when the acting face 18 is engaged with the seating face 15 of the valve ring.

The valve plug 17 has a hexagonal or six-sided hole or chamber 19, which receives a sleeve 20 having a hexagonal exterior face for interlocking the valve plug and sleeve, when the sleeve is inserted in the hole or chamber of the valve plug. The end of the valve plug opposite to the acting end or seating face 18 has a screw threaded hole 21 terminating in a plain straight face 22 and receiving a closing plug 23 having a boss 24 to receive a turnkey wrench or other instrument by means of which the plug 23 can be inserted into the end of the valve plug 17 and have the plain face of the plug impinge against the plain face of the shoulder 22 and close the end of the valve plug against leakage of steam or other fluid pressure or liquid when the valve is in use. The outer end of the neck or tube 4 is closed by a plug 25 which, as shown, has a concavity or depression 26 in its inner face, and this plug 25 has a flange 27 with a plain inner surface to abut tightly against the plain end of the neck or tube 4, when the plug is inserted, so as to tightly close the end of the neck or tube, and for inserting the plug 25 a boss 28 is formed on the exterior face of the plug 25, which boss receives a wrench or other instrument for entering the plug into position.

The sleeve 20 has a central pentagonal or five-sided hole or passage 29, and the cross wall of the acting end of the valve plug 17 has a similar hole 30 therein in line with the hole of the sleeve, as shown in Fig. 2. A stem 31 having an exterior of pentagonal or five-sided formation is entered into the corresponding shaped hole of the valve plug 17 and sleeve 20, furnishing a connection for the turning of the valve plug. The six-sided sleeve 20, with the corresponding hole or chamber therefor in the plug 17, in connection with the five-sided hole of the sleeve and the five-sided stem furnish a connection between the valve plug 17 and the operating stem 31 by which an accurate adjustment between the acting end of the valve plug and the seating face of the valve ring 12 can be obtained. The odd and even number of sides between the interior and exterior of the sleeve enables an accurate and fine adjustment for the valve plug to be obtained by reason of the multiplying of the connections between the valve plug and stem derived from or by the odd and even number of sides of the interior and exterior of the sleeve, such multiplicity giving a slight variation and enabling a close and accurate adjustment to be attained between the acting end of the valve plug and its coacting seat on the valve ring.

The valve stem 31 extends from the end wall 32 of a valve plug 33 having an annular wall with an exterior right hand screw thread. The end wall 32 of the valve plug 33 has an acting face 34 to coact with the seating face 14 of the valve ring 12, in opening and closing the passage 13 through the valve ring. The annular wall of the valve plug 33 has a seating face 35 which coacts with the end seating face 36 of a closing cap 37 having a right hand interior screw thread receiving the valve plug 33, and a right hand exterior screw thread for entering the closing cap in the neck or coupling 5 of the main shell or casing; and as shown, the closing cap 37 has a circumferential flange 38 with a plain surface or face to abut against the plain surface or face of the end of the neck or coupling 5 and form a tight joint between the closing cap and the main shell or casing. The closing cap 37 has a cone section or wall 39 extending from which is a neck 40 terminating in a flange 41, in the construction shown.

The closing plug 33 has an interior hole or chamber 42 with a hexagonal or six-sided face, and this hole or chamber 42 receives a stem or plug 43 having a hexagonal or six-sided exterior, so that when the stem or plug 43 is entered into the hole or chamber 42 a connection is furnished between the stem 43 and the valve plug 33 by which the turning of the stem in opposite directions will advance and withdraw the valve plug. The stem or plug 43 has a tapered end 44 forming a cone 45 the face of which coacts with a conical seating face 46 on the wall 39 of the closing cap, so that when the stem 43 has turned the valve plug 33 to its withdrawn position for the seating faces 35 and 36 to be in close engagement, the cone 45 will bear closely against the seating face 46 and make a close tight joint between the stem 43 and the cap. It will thus be seen that the plug 33 has a double guard and protection against the passage of steam or gas or liquid, when the valve is open by reason of the contact faces 35 and 36 and the contacting faces 45 and 46, and a double guard or protection is also furnished for the valve plug 33, when the valve is closed, as shown in Fig 1, by reason of the contacting faces 14 and 34, and the contacting faces 45 and 46. The double guard and protection against any escape around the plug 33 is insured by reason of the upward pressure against the face of the valve plug in either the open or closed position, which pressure tends to maintain the threads of the valve plug in close engagement, and to maintain the acting face of the cone 45 against the seating face of the wall 39. The valve plug 17 is guarded and protected against escape of steam, gas or liquid when the valve is open by the threaded exterior and the end plug 23, and with the valve plug closed the same protection against escape around and through the plug is present through the engaging threads and the end closing plug.

The operating stem 43 is continued as a stem 47 circular in cross section and having an exterior screw thread, and this stem receives an adjusting plate 48 having a screw threaded hole and a projecting surface 49 which coacts with the face of the flange 41 and forms a tight joint between the neck 40 and the plate 48, when the end face of the adjusting plate is in engagement with the end face of the neck. The outer face of the adjusting plate 48 has therein a hexagonal or six-sided depression or countersink 50 which receives a hexagonal or six-sided locking plate 51, which plate has a hub or boss 52 through which and the body of the plate is a pentagonal or five-sided hole 53, giving the locking plate 51 in effect a six-sided exterior and five-sided interior. The locking plate 51 with its hub or boss 52 is entered onto a pentagonal or five-sided extension 54 of the stem 47, so as to furnish a fulcrum for turning the stem 47 and the stem 43 for advancing and withdrawing the plug valve 33 into its closed and open position. The locking plate 51 has on its outer face three pins 55, in the arrangement shown in Fig. 3, and these pins 55 enter holes 56 in the inner face of the hand wheel 57, so as to connect the hand wheel with the adjusting plate 48, after the plate has adjusted the valve plugs. The hand wheel 57 has a center hole 58 to receive the hub or boss 52 of the plate 51, and the inner face of the hand wheel has a countersink 59 to receive the edge of the adjusting plate 48 and the locking plate 51, so that when the pins 55 are engaged with the holes 56, the hand wheel will be firmly connected with the plates 51 and 48 for operating the valve plugs. The outer face of the hand wheel 57 has a countersink 60 to receive a plate or washer 61, which, with the hand wheel, is entered over a reduced section 61 of the stem 47, which section has an exterior screw thread and receives a jam nut 63 by means of which the hand wheel is securely held in place.

The adjusting plate 48 is threaded onto the stem 47 to an extent for furnishing a bearing between the cone 45 and the seating face 46, with the valve plug 33 and the valve plug 17 in adjusted position for closing the valve, and when the proper adjustment for the valve plugs in relation to their seats is obtained, the locking plate 51 is entered into the countersink 50 therefor in the adjusting plate 48, after which the hand wheel is placed in position, with the pins 55 entering the holes 56 of the hand wheel, and the washer 61 is entered onto the stem 62 and the jam or lock nut 63 entered onto the stem, holding the several parts together. The six-sided periphery or outer edge of the locking plate 51, in connection with the five-sided hole 53 in the hub and plate, and the five-sided stem 54, enables a multiplicity of adjustments to be obtained for the adjusting plate 48, so that an accurate and perfect adjustment for the adjusting plate 48 and stem 47 to properly and correctly adjust the valve plugs can be obtained. The adjustment of the seating faces of the valve plug and valve ring, and for the cone of the stem, can be varied as required by simply setting the adjusting plate 48 so as to have the proper bearing between the adjusting plate and the end of the neck by which the cone 45 of the stem will be held against the bearing or seating face 46 of the cap, and the seating face 34 will coact with the seating face 14, and the seating face 18 will coact with the seating face 15 for closing the valve, as shown in Fig. 1, and have the cone 45 and its seating face 46 in contact, with the seating face 35, and the seating face 36 in contact, when the valve is open, as shown in Fig. 2. This accurate and perfect adjustment of the seating faces, is attained through the six-sided sleeve 20 and five-sided stem 31, and the six-sided plate 51 and five-sided section 54 of the stem 47, will enable the two valve plugs to be varied to a slight extent in adjustment for insuring a perfect, positive and reliable seating of the valve plugs in opening and closing the valve.

The parts are assembled by entering the stem or plug 43 into the opening 42, and threading the valve plug 33 into the cap 37 for the cone 45 to engage the seating face 46, and for the seating face 35 to engage the seating face 36; the adjusting plate 48 is threaded onto the projecting end of the stem 47, so as to have the proper bearing on the end of the neck 40 when the valve plug 33 is both open and closed, and with either condition of the valve plug for the cone 45 to be in engagement with its seat 46 of the valve cap. After the adjusting plate has been adjusted for the proper adjustment of the valve plug 33 the locking plate 51 is entered into the hexagonal recess or depression 50, with the hub 52 and the plate 51 interlocking with the section 53 of the stem. The hand wheel is then placed in position to engage the pins 55 and is locked in place by the washer 61, and the lock or jam nut 63 entered onto the threaded end 62 of the stem. The ring valve seat 12 is threaded through the neck or tube 44 and into the cross wall or partition 6, with the stem 31 extending through the passage 13 of the ring wall, as shown in Fig. 2. The valve plug 17 with the sleeve 20 is then entered into position in the neck or tube 4 for the stem 31 to engage the sleeve 20 and lock the two valve plugs 17 and 33 together, so that the turning of the stem 47 will simultaneously advance or simultaneously withdraw both valve plugs. The plug cap 21 is threaded into the end of the valve plug 17, and the plug cap 25 threaded into the end of the neck or tube 4, closing the end of the valve plug and the end of the neck or tube and assembling the valve as a whole ready for use.

The valve in use is connected with the supply pipe and lead pipe by the couplings 2 and 3 respectively, and when connected by turning the hand wheel in the proper direction the valve plugs 17 and 33 will both be simultaneously advanced so as to close the opening or passage 13 through the valve seat 12, and shut off the flow of steam, air, gas or liquid through the passageway of the valve, as shown in Fig. 1, and by turning the hand wheel in the opposite direction the valve plugs 17 and 33 will be simultaneously withdrawn into the open position, as shown in Fig. 2, opening the passage 13 of the ring valve seat 12 for steam, air, gas or liquid to flow through the valve.

The entire operative parts or elements of the valve are made of metal, dispensing with the use of extraneous packing, though, if desired, a packing might be employed for the seats of the valve ring, but it is preferred to have all of the seats formed of metal without packing, making a perfect packless valve. The metal faces for the seating surfaces of the valve plugs and the coacting seats are held in close contact with the valve open, or with the valve closed, by reason of the pressure against the seats or faces of the valve plugs, which pressure for the valve plug 33, in conjunction with the threaded connection for the valve plug, insures a contact of the cone 45 with its coacting face, without producing any great amount of wear for the cone, and at the same time the position of the cone is one which allows the free turning of the stem or plug 43 in either direction for simultaneously advancing and withdrawing the valve plugs 17 and 33 to close and open the valve, without any appreciable wear on the valve seats in opening and closing the valve. Any wear between the seating faces of the valve arising from the use of the valve can be taken up by readjusting the stem 47 through the adjusting plate 48, and when the readjustment is obtained, such adjustment can be maintained by the reëngagement of the locking plate 51 and the hand wheel 57.

It will be understood that the acting face 45 of the cone 44 has a continuous contact with the bearing face 46 irrespective of the position of the valve plug 33, so as to maintain a closure around the cone against the escape of steam, air, gas, liquid or other pressure-producing medium. This bearing of the cone is not affected or disturbed by the pressure flowing through the passage of the valve shell or casing, as with the valve closed the pressure is against the end of the valve plug 33 and is not transmitted to the stem 43 and its cone 44, and with the valve open the pressure is against the end of the valve plug 33 and the seating faces 35 and 36 and the threads of the valve plug, so as not to affect the relation of the cone 44 as to its bearing against the seat therefor. This relieving the cone from the effects of pressure passing through the valve prevents any excessive wear of the acting face 45 of the cone and insures a self-packing of the valve around the cone and valve plug 33, whether the valve plug is advanced or withdrawn. The valve plug 33, for convenience, is termed the first or front valve plug, and the valve plug 17, for convenience, is termed the second or rear valve plug; the acting face 45 of the cone 44 and the acting face 35 of the valve plug 33 can be designated as the first or front acting faces, and the acting face 34 of the valve plug 33 and the acting face 18 of the valve plug 17 can be designated as the rear acting faces; the seating faces 36 and 46 can be designated as the front seating faces, and the seating faces 14 and 15 can be designated as the rear seating faces. This designation of the various parts will facilitate the reading of the claims.

The construction shown has the adjusting sleeve 20 with the exterior plain faces even in number and the interior plain faces odd in number, but the construction of this sleeve could be one having the exterior plain faces odd in number and the interior plain faces even in number, or both the exterior and interior plain faces of the sleeve could be odd in number, as for instance, five and seven, or even in number, as for instance, four and six, but an odd and even number is preferred for the plain faces, thereby giving a greater range of adjustments. It will be understood that the exterior of the operating stem 31 will have plain faces corresponding in number to the plain faces for the interior of the sleeve. The locking plate 51 shown is formed with an even number of plain exterior faces and an odd number of plain interior faces, but the odd numbers could be for the exterior and the even number for the interior, or both the exterior and interior faces could be odd in number as five and seven, or even in number as four and six. An odd and even number for the plain faces of the locking plate is preferred, as thereby increased range of adjustment is obtained, and it will be understood that the depression in the adjusting plate 48 should have plain faces corresponding in number to the exterior plain faces of the locking plate, and the stem section receiving the locking plate should have an exterior with plain faces corresponding in number to the number of plain faces for the interior of the locking plate.

What I claim as new and desire to secure by Letters Patent is:

1. In a high pressure valve, the combination of a casing, a cross wall within the casing dividing the interior of the casing into an inlet passage and an outlet passage, a ring carried by the cross wall and having a seating face on each side, a first and second valve plug oppositely movable in relation to each other, and each valve plug having an acting face to coact with the seating face of the ring, a divided valve stem, one section adjustably entered into the first valve plug and the other section integral with and continuing from the first valve plug and adjustably entered into the second valve plug, and means for actuating the first section of the stem and simultaneously advancing and withdrawing both valve plugs, substantially as described.

2. In a high pressure valve, the combination of a casing, a cross wall within the casing dividing the interior of the casing into an inlet passage and an outlet passage, a ring carried by the cross wall and having a seating face on each side, a front valve plug operative in the casing, a rear valve plug operative in the casing, the two valve plugs oppositely movable and each having an acting face to coact with the seating face of the ring, a divided valve stem, one section adjustably entered into the front valve plug and the other section integral with and continuing from the front valve plug and adjustably entered into the rear valve plug, and means for actuating the front valve plug section of the divided stem and simultaneously advancing and withdrawing both the front and rear valve plugs, substantially as described.

3. In a high pressure valve, the combination of a casing, a cross wall within the casing dividing the interior of the casing into an inlet passage and an outlet passage, a ring carried by the cross wall and having a seating face on each side, a front valve plug operative in the casing, a rear valve plug operative in the casing, the two valve plugs oppositely movable and each having an acting face to coact with a seating face of the ring, an adjusting sleeve adjustably entered into the rear valve plug, a stem integral with and extending from the front valve plug and adjustably engaging the sleeve of the rear valve plug and connecting the front and rear valve plugs, a stem adjustably entered into the front valve plug, and means for turning the stem of the front valve plug forward and backward and simultaneously advancing and withdrawing both valve plugs, substantially as described.

4. In a high pressure valve, the combination of a casing, a cross wall within the casing dividing the interior of the casing into an inlet passage and an outlet passage, a ring carried by the cross wall and having a seating face on each side, a front valve plug operative in the casing, a rear valve plug operative in the casing, the two valve plugs oppositely movable and each having an acting face to coact with a seating face of the ring, an adjusting sleeve adjustably entered into the rear valve plug, a stem integral with and extending from the front valve plug and adjustably engaging the sleeve of the rear valve plug and connecting the front and rear valve plugs, an operating stem adjustably entered into the front valve plug, and means for turning the operating stem of the front valve plug forward and backward and simultaneously advancing and withdrawing both valve plugs, substantially as described.

5. In a high pressure valve, the combination of a casing, a cross wall within the casing dividing the interior of the casing into an inlet passage and an outlet passage, a ring carried by the cross wall and having a seating face on each side, a front valve plug operative in the casing, a rear valve plug operative in the casing, the two valve plugs oppositely movable and each having an acting face to coact with a seating face of the ring, an adjusting sleeve adjustably entered into the rear valve plug, a stem integral with and extending from the front valve plug and adjustably engaging the sleeve of the rear valve plug and connecting the front and rear valve plugs, a plug for closing the rear end of the rear valve plug, an operating stem adjustably entered into the front valve plug, and means for turning the operating stem of the front valve plug forward and backward and simultaneously advancing and withdrawing both valve plugs, substantially as described.

6. In a high pressure valve, the combination of a casing having on one side an elongated neck with an interior screw thread, and having on the opposite side a neck with an interior screw thread, a cross wall within the casing in the line of the two necks and dividing the interior of the casing into an inlet passage and an outlet passage, a ring carried by the cross wall and having a seating face on each side, a rear valve plug having an exterior screw thread and entered into the elongated neck of the casing, a cap threaded into the neck of the casing opposite the elongated neck and having an interior screw thread, a front valve plug having an exterior screw thread and entered into the cap, a connection between the front and rear valve plugs, and means for turning the front valve plug forward and backward and simultaneously advancing and withdrawing both valve plugs, substantially as described.

7. In a high pressure valve, the combination of a casing, a cross wall within the casing dividing the interior of the casing into an inlet passage and an outlet passage, a ring carried by the cross wall and having a seating face on each side, a front valve plug operative in the casing, a rear valve plug operative in the casing and having a central chamber with a plurality of plain faces even in number, an adjusting sleeve having a plurality of exterior plain faces corresponding to the plain faces of the chamber of the rear valve plug and entering into the plug and having also a central hole with a plurality of plain faces odd in number, a stem extending from the front valve plug and having an exterior with a plurality of plain faces corresponding to the interior plain faces of the sleeve and engaging the sleeve of the rear valve plug and connecting the front and rear valve plugs, and an operating stem entered into the front valve plug for turning the plug forward and backward and simultaneously advancing and withdrawing both valve plugs, substantially as described.

8. In a high pressure valve, the combination of a casing, a cross wall within the casing dividing the interior of the casing into an inlet passage and an outlet passage, a ring carried by the cross wall and having a seating face on each side, a front valve plug operative in the casing, a rear valve plug operative in the casing and having a central chamber with a plurality of plain faces even in number, an adjusting sleeve having a plurality of exterior plain faces corresponding to the plain faces of the chamber of the rear valve plug and entered into the plug and having also a central hole with a plurality of plain faces odd in number, a stem extending from the front valve plug and having an exterior with a plurality of plain faces corresponding to the interior plain faces of the sleeve and engaging the sleeve of the rear valve plug and connecting the front and rear valve plugs, an operating stem entered into the front valve plug for turning the plug forward and backward and simultaneously advancing and withdrawing both valve plugs, and a plug entered into the rear end of the rear valve plug and closing the chamber of said valve plug, substantially as described.

9. In a high pressure valve, the combination of a casing, a cross wall within the casing dividing the interior of the casing into an inlet passage and an outlet passage, a ring carried by the cross wall and having a seating face on each side, a front valve plug operative in the casing and having a central chamber with a plurality of plain faces even in number, a rear valve plug operative in the casing, the two valve plugs oppositely movable and each having an acting face to coact with a seating face of the ring, an adjusting sleeve entered into the rear valve plug, a stem extending from the front valve plug and engaging the sleeve of the rear valve plug and connecting the front and rear valve plugs, an operating stem having an exterior with a plurality of plain faces corresponding to the plain faces of the chamber of the front valve plug and entered into said chamber for turning the front plug and simultaneously advancing and withdrawing both valve plugs, substantially as described.

10. In a high pressure valve, the combination of a casing, a cross wall within the casing dividing the interior of the casing into an inlet passage and an outlet passage, a ring carried by the cross wall and having a seating face on each side, a rear valve plug operative in the casing and having a central chamber with a plurality of plain faces even in number, an adjusting sleeve having a plurality of plain faces even in number and corresponding to the plain faces in the chamber of the valve plug and having a central hole with a plurality of plain faces odd in number and entered into the rear valve plug, a stem having a plurality of plain faces on its exterior odd in number and entered into the central hole of the sleeve, and means for turning the stem forward and backward and advancing and withdrawing the rear valve plug, substantially as described.

11. In a high pressure valve, the combination of a casing, a cross wall within the casing dividing the interior of the casing into an inlet passage and an outlet passage, a ring carried by the cross wall and having a seating face on each side, a front valve plug operative in the casing and having an acting end with a front seating face and a rear seating face and having a central chamber with a plurality of plain faces even in number, a cap carrying the front seating plug and having an end seating face, a stem having an exterior with a plurality of plain faces corresponding to the plain faces in the chamber of the front valve plug, and means for turning the stem forward and backward and advancing and withdrawing the front valve plug, substantially as described.

12. In a high pressure valve, the combination of a casing, a cross wall within the casing dividing the interior of the casing into an inlet passage and an outlet passage, a ring carried by the cross wall and having a seating face on each side, a rear valve plug operative in the casing and having a central chamber with a plurality of plain faces even in number, an adjusting sleeve having a plurality of plain faces even in number and corresponding to the plain faces in the chamber of the valve plug and having a central hole with a plurality of plain faces odd in number and entered into the rear plug, a front valve plug operative in the casing and having an acting end with a front seating face and a rear seating face and having a central chamber with a plurality of plain faces even in number, a stem projecting from the front valve plug and having a plurality of plain faces on its exterior odd in number and entered into the central hole of the sleeve of the rear valve plug, a cap carrying the front valve plug and having an end seating face, a stem having an exterior with a plurality of plain faces corresponding to the plain faces in the chamber of the front valve plug, and means for turning the stem forward and backward and advancing and withdrawing both the front valve plug and the rear valve plug, substantially as described.

13. In a high pressure valve, the combination of a casing, a cross wall within the casing dividing the interior of the casing into an inlet passage and outlet passage, a ring carried by the cross wall and having a seating face on each side, a front valve plug operative in the casing and having an acting end with a front seating face and a rear seating face and having a central chamber with a plurality of plain faces even in number, a cap entered into the casing and carrying the front valve plug, and having an end seating face and an interior seating face, a stem having an exterior with a plurality of plain faces corresponding to the plain faces in the chamber of the front valve plug, a cone on the stem having an acting face engaging the interior seating face on the cap, an adjusting plate on the stem, and a locking plate for the adjusting plate, substantially as described.

14. In a high pressure valve, the combination of a casing, a cross wall within the casing dividing the interior of the casing into an inlet passage and outlet passage and having a seating face for a valve plug, a front valve plug operative in the casing and having an acting end with a front seating face and a rear seating face and having a central chamber with a plurality of plain faces even in number, a cap entered into the casing and carrying the front valve plug and having an end seating face and an interior seating face, a stem having an exterior with a plurality of plain faces corresponding to the plain faces in the chamber of the front valve plug, a cone on the stem having an acting face engaging the interior face on the cap, an adjusting plate on the stem having in its outer face a depression with a plurality of plain faces even in number, and a locking plate entered into the adjusting plate and having an exterior with a plurality of plain faces even in number and corresponding to the plain faces of the depression in the adjusting plate and having a central hole with a plurality of plain faces odd in number, substantially as described.

15. In a high pressure valve, the combination of a casing, a cross wall within the casing dividing the interior of the casing into an inlet passage and an outlet passage and having a seating face for a valve plug, a front valve plug operative in the casing and having an acting end with a front seating face and a rear seating face and having a central chamber with a plurality of plain faces even in number, a cap entered into the casing and carrying the front valve plug and having an end seating face and an interior seating face, a stem having an exterior with a plurality of plain faces corresponding to the plain faces in the chamber of the front valve plug, a cone on the stem having an acting face engaging the interior face on the cap, an adjusting plate on the stem having in its outer face a depression with a plurality of plain faces even in number, a locking plate entered into the adjusting plate and having an exterior with a plurality of plain faces even in number and corresponding to the plain faces of the depression in the adjusting plate and having a central hole with a plurality of plain faces odd in number, and a section of the stem having an exterior with a plurality of plain faces corresponding to the interior plain faces of the locking plate for interlocking the operating stem and the adjusting plate, substantially as described.

16. In a high pressure valve, the combination of a casing a cross wall within the casing dividing the interior of the casing into an inlet passage and an outlet passage and having a seating face for a valve plug, a front valve plug operative in the casing and having an acting end with a front seating face and a rear seating face and having a central chamber with a plurality of plain faces even in number, a cap entered into the casing and carrying the front valve plug and having an end seating face and an interior seating face, a stem having an exterior with a plurality of plain faces corresponding to the plain faces in the chamber of the front valve plug, a cone on the stem having an acting face engaging the interior face on the cap, an adjusting plate on the stem having in its outer face a depression with a plurality of plain faces even in number, a locking plate entered into the adjusting plate and having an exterior with a plurality of plain faces even in number and corresponding to the plain faces of the depression in the adjusting plate and having a central hole with a plurality of plain faces odd in number, a section of the stem having an exterior with a plurality of plain faces corresponding to the interior plain faces of the locking plate for interlocking the operating stem and the adjusting plate, a plurality of pins on the locking plate, a hand wheel engaged with the pins, and means for retaining the hand wheel on the operating stem, substantially as described.

17. In a high pressure valve, the combination of a casing, a cross wall within the casing dividing the interior of the casing into an inlet passage and an outlet passage with a seating face on each side of the cross wall, a front valve plug operative in the casing and having an acting end with a seating face and having a central chamber with a plurality of plain faces, a cap carrying the front valve plug and having an end seating face, a rear valve plug operative in the casing and having an acting end with a seating face and having a central chamber with a plurality of plain faces, an adjusting sleeve entered into the central chamber of the rear valve plug and having an exterior and an interior each with a plurality of plain faces one series of plain faces being even in number and the other series odd in number, a stem extending from the front valve plug and having an exterior with a plurality of plain faces corresponding to the interior plain faces of the adjusting sleeve and entered into the sleeve, an operating stem having an exterior with a plurality of plain faces corresponding to the plain faces in the chamber of the front valve plug and entered into the chamber, and means for turning the stem forward and backward and simultaneously advancing and withdrawing the front and rear valve plugs, substantially as described.

18. In a high pressure valve, the combination of a casing, a cross wall within the casing dividing the interior of the casing into an inlet passage and an outlet passage and having a seating face, a rear valve plug having an acting end engaging the seating face of the cross wall and having a chamber with a plurality of plain faces, an adjusting sleeve having an exterior with a plurality of plain faces and an interior with a plurality of plain faces, the plain faces of one series even in number and the plain faces of the other series odd in number, a stem having an exterior with a plurality of plain faces corresponding in number to the interior plain faces of the adjusting sleeve and entered into the sleeve, and means for turning the stem and advancing and withdrawing the rear valve plug, substantially as described.

19. In a high pressure valve, the combination of a casing, a cross wall within the casing dividing the interior of the casing into an inlet passage and an outlet passage and having a seating face, a cap entered into the casing on one side and having an end seating face, a front valve plug operative in the cap of the casing and having an acting end with a front seating face and a rear seating face and having a central chamber with a plurality of plain faces, a stem having an exterior with a plurality of plain faces corresponding to the plain faces in the chamber of the valve plug, and means for turning the stem forward and backward and advancing and withdrawing the valve plug, substantially as described.

20. In a high pressure valve, the combination of a casing, a cross wall within the casing dividing the interior of the casing into an inlet passage and an outlet passage and having a seating face, a cap entered into the casing on one side and having an end seating face and an interior seating face, a front valve plug operative in the casing and having an acting end with a front seating face and a rear seating face and having a central chamber with a plurality of plain faces, a stem having an exterior with a plurality of plain faces corresponding to the plain faces in the chamber of the valve plug and having a conical acting face engaging the interior seating face of the cap, and means for turning the stem forward and backward and advancing and withdrawing the front valve plug, substantially as described.

21. In a high pressure valve, the combination of a casing, a cross wall within the casing dividing the interior of the casing into an inlet passage and an outlet passage and having a seating face, a cap entered into the casing on one side and having an end seating face and an interior seating face, a front valve plug operative in the casing and having an acting end with a front seating face and a rear seating face and having a central chamber with a plurality of plain faces, a stem having an exterior with a plurality of plain faces corresponding to the plain faces in the chamber of the valve plug and having a conical acting face engaging the interior seating face of the cap, an adjusting plate for the stem, a locking plate engaged with the adjusting plate, and a hand wheel engaged with the locking plate, substantially as described.

22. In a high pressure valve, a casing, a cap entered into one side of the casing, a valve plug operative in the casing and having an acting end with a seating face engaging a seating face on the end of the cap and having a central chamber with a plurality of plain faces, a stem having an exterior with a plurality of plain faces corresponding to the plain faces in the chamber of the valve plug and having a conical acting face engaging a seating face on the interior of the cap, an adjusting plate for the stem having a depression with a plurality of plain edge faces, a locking plate having a plurality of plain edge faces corresponding to the faces of the depression in the adjusting plate and having a plurality of interior plain faces, the plain faces of one series for the locking plate being even in number and the plain faces of the other series being odd in number, a section of the operating stem having an exterior with a plurality of plain faces corresponding to the interior plain faces of the locking plate, and means engaged with the locking plate for turning the operating stem forward and backward and advancing and withdrawing the valve plug, substantially as described.

23. In a high pressure valve, the combination of a casing, a cross wall within the casing dividing the interior of the casing into an inlet passage and an outlet passage and having a seating face for a valve plug, a valve plug operative in the casing and having an acting face engaging the seating face of the cross wall, an adjusting sleeve having a plurality of exterior and interior plain faces and entered into the valve plug, and a stem having a plurality of exterior plain faces engaging the interior plain faces of the sleeve for advancing and withdrawing the valve plug, substantially as described.

24. In a high pressure valve, the combination of a casing, a cross wall within the casing dividing the interior of the casing into an inlet passage and an outlet passage and having a seating face for a valve plug, a cap entered into the casing, a valve plug operative in the cap and having an acting end with a seating face, a stem engaged with the valve plug, an adjusting plate for the stem, and a locking plate for the adjusting plate having a plurality of exterior and interior plain faces and engaged with the operating stem for adjusting and advancing and withdrawing the valve plug, substantially as described.

25. In a high pressure valve, the combination of a casing, a cross wall within the casing dividing the interior of the casing into an inlet passage and an outlet passage and having a seating face for a valve plug, a cap entered into the casing and having an end seating face and an interior seating face, a valve plug operative in the casing and having an acting end with a seating face on its front and rear sides a stem entered into the valve plug and having a conical seating face, an adjusting plate for the stem, and a locking plate having a plurality of exterior and interior plain faces and engaged with the adjusting plate and the operating stem for adjusting and advancing and withdrawing the valve plug, substantially as described.

26. In a high pressure valve, the combination of a casing, a cross wall within the casing dividing the interior of the casing into an inlet passage and an outlet passage and having a seating face for a valve plug, a cap entered onto the casing and having an end seating face and an interior seating face, a valve plug operative in the casing and having an acting end with a seating face on its front and rear sides, a stem entered into the valve plug and having a conical seating face, an adjusting plate for the stem, a locking plate having a plurality of exterior and interior plain faces and engaged with the adjusting plate and the operating stem for adjusting and advancing and receding the valve plug, a valve plug having an acting face and engaging a seating face of the cross wall, an adjusting sleeve entered into the valve plug and having a plurality of exterior and interior plain faces, and a stem between the two valve plugs and having an exterior face engaging the interior plain faces of the adjusting sleeve for adjusting and advancing and withdrawing the valve plug, substantially as described.

JAMES A. BISHOP.

Witnesses:
OSCAR W. BOND,
WALKER BANNING.